US007019785B2

(12) United States Patent
Masuyama et al.

(10) Patent No.: US 7,019,785 B2
(45) Date of Patent: Mar. 28, 2006

(54) PAN/TILT APPARATUS AND CAMERA EQUIPPED WITH THE SAME

(75) Inventors: Kenji Masuyama, Kofu (JP); Toyoyuki Hara, Yamanashi-ken (JP)

(73) Assignee: Nisca Corporation, Yamanashi-Ken (JP)

(*) Notice: Subject to any disclaimer, the term of this patent is extended or adjusted under 35 U.S.C. 154(b) by 666 days.

(21) Appl. No.: 10/180,983

(22) Filed: Jun. 27, 2002

(65) Prior Publication Data

US 2003/0001963 A1 Jan. 2, 2003

(30) Foreign Application Priority Data

Jun. 28, 2001 (JP) ............................ 2001-197544
Jun. 28, 2001 (JP) ............................ 2001-197545

(51) Int. Cl.
*H04N 5/225* (2006.01)

(52) U.S. Cl. ...................................................... 348/374

(58) Field of Classification Search ................ 348/373, 348/374, 375, 376, 143; 396/427, 428
See application file for complete search history.

(56) References Cited

U.S. PATENT DOCUMENTS 4,736,217 A * 4/1988 McDowell .................. 396/428
5,870,642 A * 2/1999 Mittelstaedt et al. ....... 396/428
6,356,308 B1 * 3/2002 Hovanky .................... 348/373

* cited by examiner

*Primary Examiner*—David L. Ometz
*Assistant Examiner*—Adam L. Henderson
(74) *Attorney, Agent, or Firm*—Manabu Kanesaka

(57) ABSTRACT

A camera has a lens portion and an imaging portion arranged on a rotating stand of a pan/tilt apparatus. The pan/tit apparatus includes a device frame; a rotating stand; a regulating device for defining two end positions of an operational range of the rotating stand, and a drive device for driving the rotating stand. The drive device has a rotor and a stator. The rotor has a permanent magnet and an output shaft for engaging an arm portion of the rotating stand. The stator includes an excitation coil for applying a rotational force to the permanent magnet when an electrical current flows in the excitation coil. An electric control device controls the electrical current.

16 Claims, 13 Drawing Sheets

PAN/TILT APPARATUS AND CAMERA EQUIPPED WITH THE SAME

BACKGROUND OF THE INVENTION AND RELATED ART STATEMENT

This invention relates to an electronic pan and tilt apparatus that can change a direction of an electronic still or video camera, and also relates to a camera that employs the same.

Conventionally, in a camera with remote operation capability such as a video camera operated by remote control, a motor drives the camera through a gear mechanism to change a direction thereof by moving a camera unit up and down or left and right.

Many of such cameras are equipped with a zoom function from 8 to 20 magnifications. It is also common to pan and tilt the camera in multiple directions within an operating range of the camera. In setting a shooting direction, a direction toward a subject and a zoom magnification are determined while viewing an image on a monitor. Alternatively, a predetermined direction and a zoom magnification are stored in a memory for automatic adjustment of the camera.

Such a pan/tilt camera is suitable for shooting a subject at a far and wide area to display a large figure on a monitor. However, as a door camera to just swing vertically to see a person according to a height, or as a camera for shooting inside a house, it is insufficient to recognize the subject if a camera has a short focal point and a lens view angle of approximately 50° directed in only two or three directions.

In recent years, such a single focus lens cameras has become smaller, and the whole system including a lens, an imaging unit and a processing unit can fit into even a two square centimeter area. However, when such a camera is driven by a motor with gears to tilt like the conventional device, a size of the combined device increases due to the tilt apparatus, making it difficult to take advantage of the small camera size.

Even in the case that only two or three shooting directions are necessary, the conventional control method needs to detect the shooting directions and store the direction information in a memory. Thus, it is difficult to reduce a cost and a size of the device and to simplify the control mechanism.

Also, when shooting a far and wide area, a subject is mostly in a horizontal position. For example, only a limited vertical shooting range is necessary for an outdoor monitoring camera, as there is no need to shoot a sky or a ground. It is sufficient to move a camera slightly up and down to cover a difference in heights among persons when shooting a participant in a group during a TV conference. For such a use, the conventional camera, which has the same range in both vertical and horizontal directions, has more than enough pan/tilt capability, resulting in an unnecessary high price.

In view of resolving the problems, an object of the present invention is to provide a camera with a simple and low cost pan/tilt apparatus.

Further objects and advantages of the invention will be apparent form the following description of the invention.

SUMMARY OF THE INVENTION

According to the present invention, a pan camera is equipped with a permanent magnetic rotor that has two magnetic poles and moves reciprocally by a predetermined rotation angle within 180°; a fixed excitation coil; an output shaft fixed to the rotor; and at least a lens and an imaging unit that engages the output shaft to move. The rotor rotates in left and right directions by a magnetic effect on the rotor according to a current direction flowing through the excitation coil, and stops at either of two end positions of an operational range. The imaging unit faces one of two shooting directions at either of the two end positions, and maintains the shooting direction while an electrical current flows in the excitation coil.

Also, according to the present invention, a pan camera is equipped with a permanent magnetic rotor that has two magnetic poles and moves reciprocally by a predetermined rotation angle within 180°; a fixed excitation coil; an output shaft fixed to the rotor; and at least a lens and an imaging unit that engages the output shaft to move. The rotor is held at central and both end positions of rotation by an urging force and a magnetic effect on the rotor according to an electrical current flowing through the excitation coil. The imaging unit faces three shooting directions at the center and both end positions, and maintains one of the three shooting directions according to a current direction or no current.

According to the present invention, the camera capable of panning and tilting in two or three directions can be made small, inexpensive and easy for remote control. Furthermore, the control device has a simple structure because the control operation involves only the current direction in the excitation coil and the switching of the power.

Also, this tilting mechanism may be employed only for up and down directions, and a conventional mechanism may be employed for left and right directions to reduce a cost by removing unnecessary functions.

DETAILED DESCRIPTION OF THE PREFERRED EMBODIMENT

Hereunder, embodiments of the invention will be explained with reference to the accompanied drawings. The embodiments relate to a pan/tilt camera that uses an electrically powered panning device according to the present invention. The pan/tilt camera changes a shooting direction by panning to up, down, left and right directions.

Figure 1:
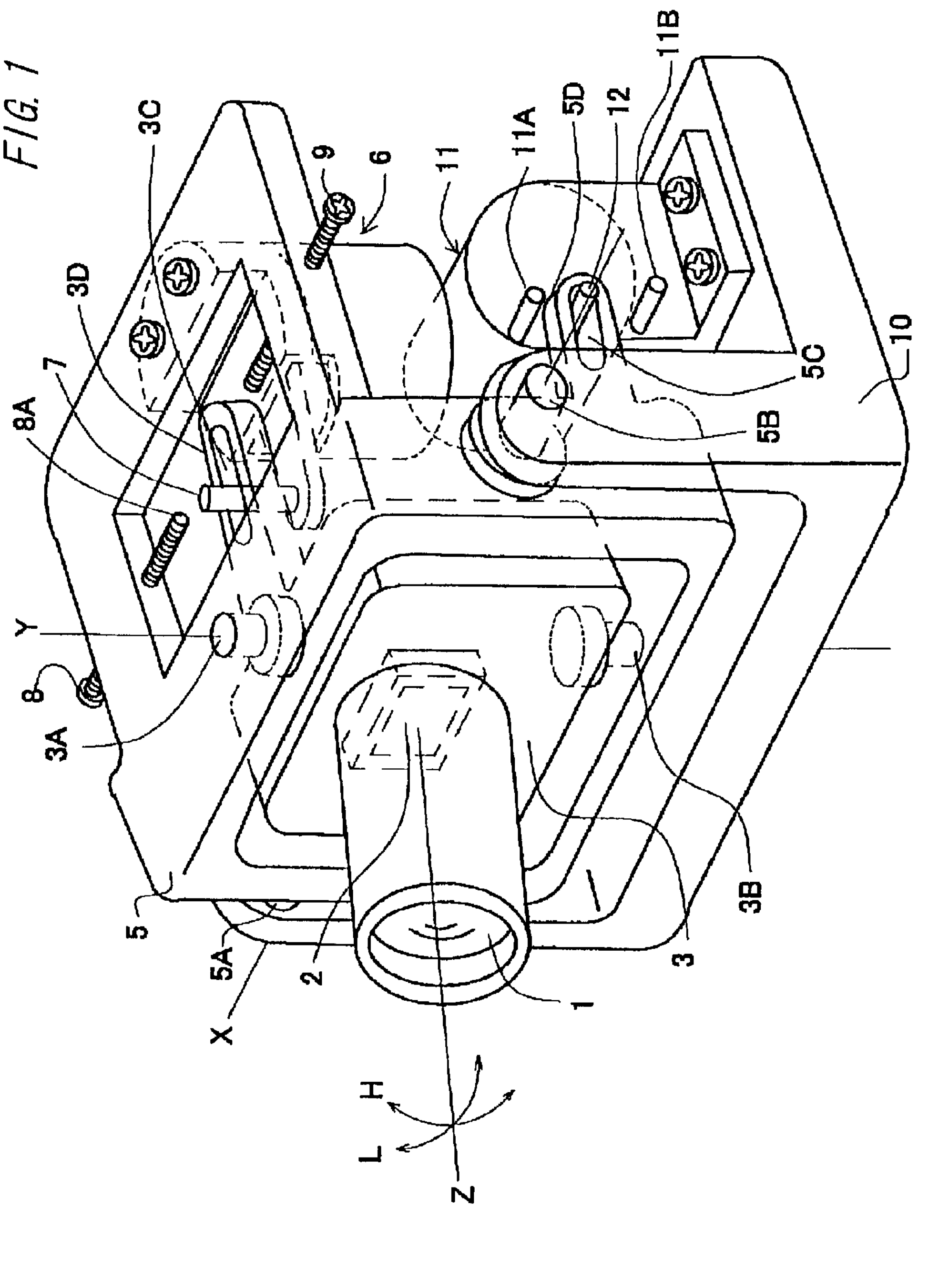
FIG. 1 is a perspective view of an overall structure of the invention.

FIG. 1 shows a general configuration of an entire apparatus. A camera unit 3 is equipped with a lens unit 1 and an imaging unit 2, and is supported on a rotating frame 5 by rotating axes 3A and 3B formed on a vertical axis Y so that the camera unit can rotate. A lens axis Z is a shooting direction and is movable in a direction L. An output shaft 7 of a solenoid actuator 6 screwed to the rotating frame 5 engages a slit 3C formed on the camera unit 3. The solenoid actuator 6 drives the camera.

Figure 2:
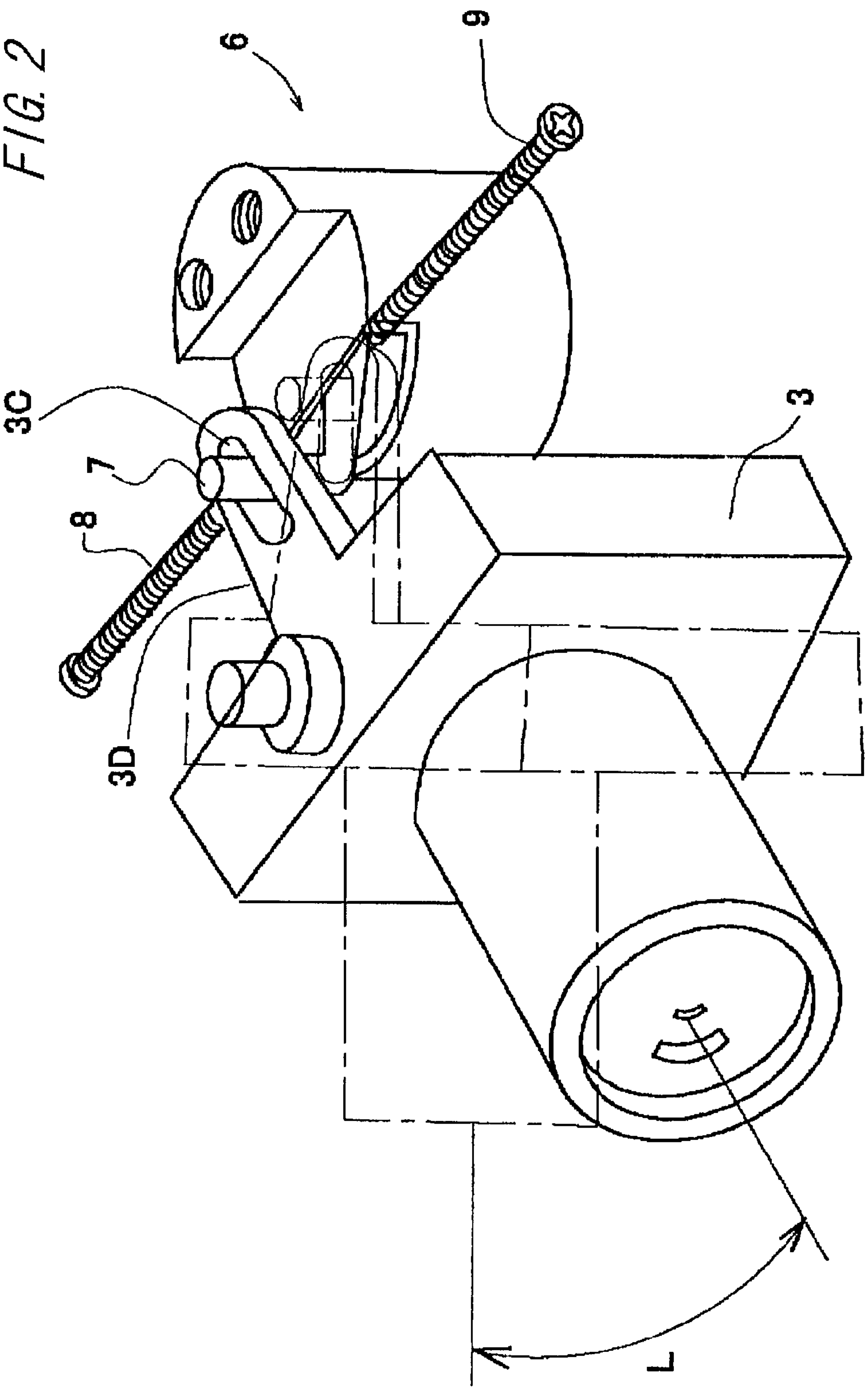
FIG. 2 is an explanatory view showing a shooting direction of a two-direction pan camera.

Distal ends of adjustment screws 8 and 9 (distal end of the adjustment screw 8 is 8A) mounted to the rotating frame 5 abut against an arm portion 3D formed on the camera unit 3A to regulate a rotational range of the camera unit 3. An amount of protruding portions of the adjustment screws 8 and 9 can be adjusted by rotating the screws. As shown in FIG. 2, the shooting direction in the direction or range L for the lens axis Z can be adjusted to stop at the both end positions.

Other than the configuration shown above, it is perfectly acceptable to establish adjustable means on other moving parts for regulating the shooting direction in the direction L for the lens axis Z at both end positions.

In the above structure, the camera can pan left and right in the direction or range L. The following will describe an operation related to a vertical movement of the camera in a direction H.

The rotating frame 5, which supports the camera unit 3 and the solenoid actuator 6, is supported on a support body 10 by rotating shafts 5A and 5B formed on a horizontal axis X of the rotating frame 5, so that the lens axis Z of the shooting direction is movable along the direction or range H. An output shaft 12 of a solenoid actuator 11 screwed to the support body 10 engages a slit 5C formed on the rotating frame 5. The solenoid actuator 11 drives the rotating frame.

Protruding portions 11A and 11B formed on the solenoid actuator 11 abut against an arm portion 5D formed on the rotating frame 5 to limit a rotational range of the rotating frame 5, so that both end positions of the shooting direction of the lens axis Z in the direction H are defined. Although the above example is provided for the present embodiment, it is perfectly acceptable to establish adjustable means on other moving parts for regulating the shooting direction in the H direction for the lens axis Z at both end positions.

According to the present invention, the same panning mechanism is provided for both the vertical and horizontal directions. However, it is perfectly acceptable to combine the conventional panning mechanism with the panning mechanism according to the present invention depending on a shooting range and a position of a shooting target.

Figure 3:
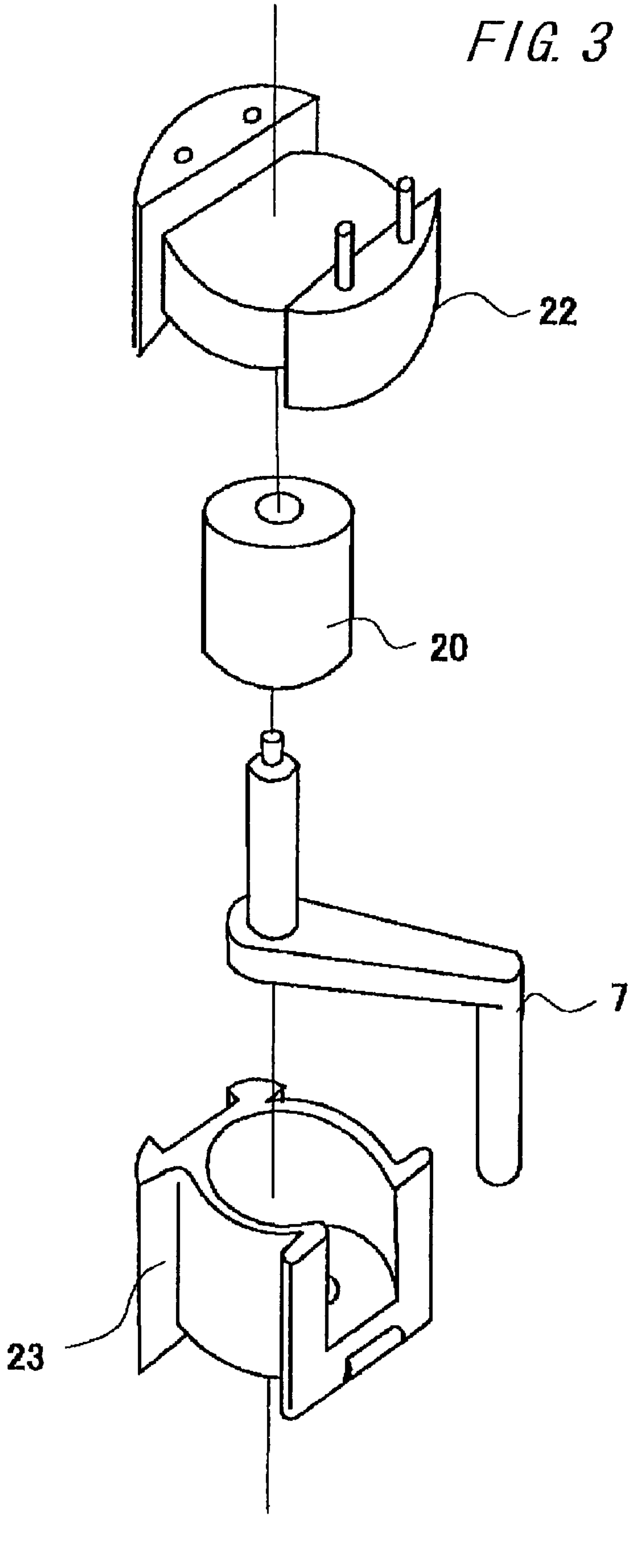
FIG. 3 is an exploded perspective view showing a rotor portion of the two-direction pan camera.

The following describes an internal configuration of the solenoid actuator. As clearly shown in FIG. 3, an output shaft 7 is inserted at the center of a magnetic rotor 20 having a cylindrically shape and two magnetic poles, so that the output shaft 7 is supported and rotates inside of bobbins 22 and 23.

Figure 4:
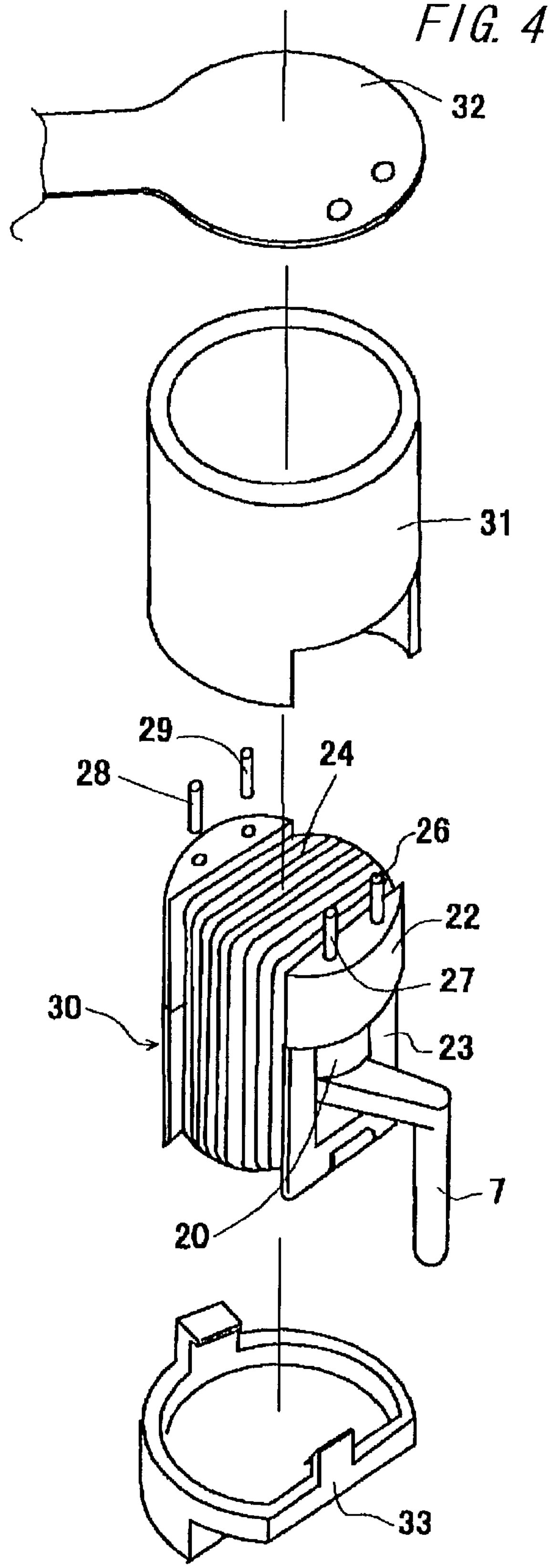
FIG. 4 is an exploded perspective view showing a solenoid actuator of the two-direction pan camera.

Further, an excitation coil 24 is arranged to surround the rotor 20 inside the joined bobbins 22 and 23 as shown in FIG. 4. Terminal pins 26 and 27 are fastened to the bobbin 22 to wind wire ends of the excitation coil 24. Also, strong magnetic bodies 28 and 29 are disposed in holes established on the bobbin 22.

A drive unit 30 configured above is surrounded by a hollow, cylindrically shaped magnetic circuit member (yoke) 31, a conductive wire print board 32 connected to the excitation coil 24 and a cover 33, and retained therein.

Figure 5:
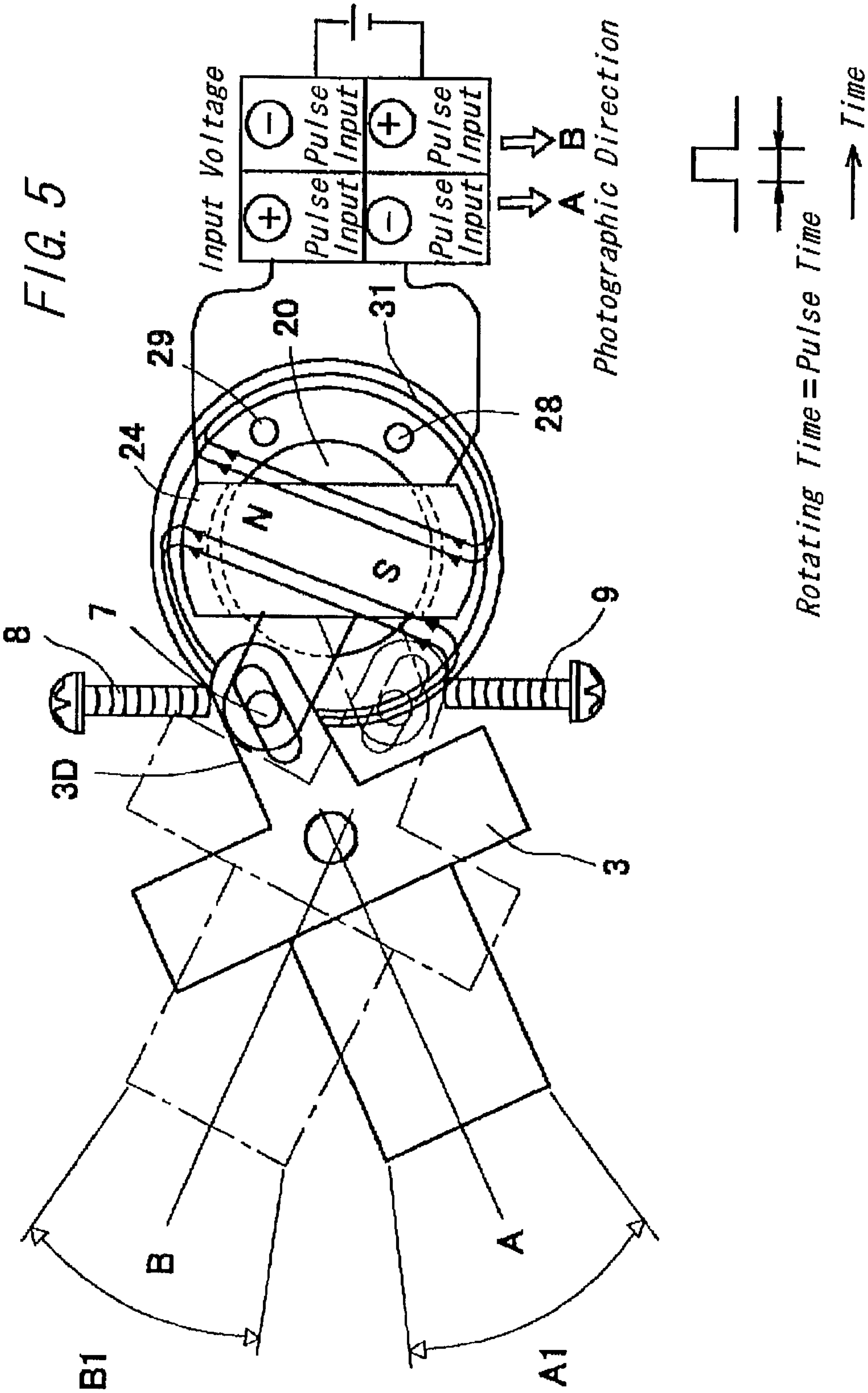
FIG. 5 is an explanatory view showing an operation of the two-direction pan camera.

Operations of the camera unit and the solenoid actuator will be explained below. FIG. 5 shows relationships of the operations. In the rotor with the two magnetic poles, the N pole is magnetically attracted to the strong magnetic body 29. The arm portion 3D formed on the camera unit 3 abuts against the adjustment screw 8 to stop at the first stopping position, and the shooting direction of the camera unit 3 faces a direction A. The second stopping position of the rotor 20 is a position where the S pole is magnetically attracted to the strong magnetic body 28 and the arm portion 3D abuts against the adjustment screw 9, where the shooting direction of the camera unit 3 faces a direction B.

Figure 6:
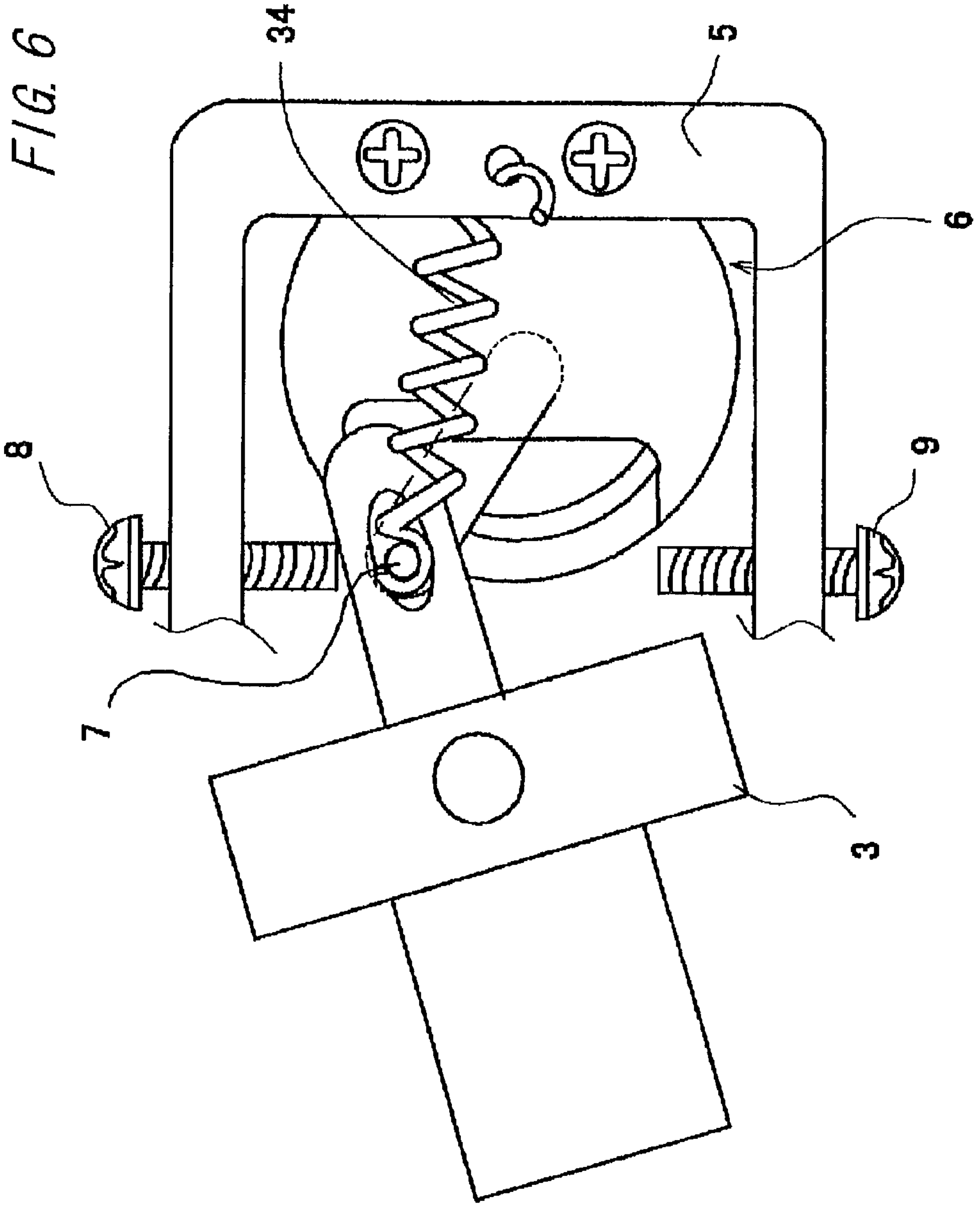
FIG. 6 shows a holding device of the two-direction pan camera.

The rotor 20 rotates in either a clockwise or a counterclockwise direction according to a current flow direction in the excitation coil 24 through the magnetic effect of the rotor 20. An electrical pulse current flows in the excitation coil for a period of time need just enough to rotate, and the magnetic attraction between the pole on the rotor and the strong magnetic body is enough to hold the camera unit at the stopping position thereby conserving electrical power. Also, as the way other than that described above for holding the camera unit at the stopping position, as shown in FIG. 6, a tension spring 34 stretched between the rotating frame 5 and the output shaft 7 may be employed as a way for holding the camera unit at the stopping position.

The shooting directions A and B for the camera unit shown in FIG. 5 are determined by adjusting either of the screw 8, or 9, which abuts against the arm portion 3D formed on the camera unit 3. As shown in FIG. 1, the screw 8 or 9 can rotate to adjust the amount of protrusion of distal ends to change the shooting directions A and B. Shooting ranges of A1 and B1 in the shooting directions A and B may be overlapped to eliminate a dead angle in the panning range of the camera unit.

Figure 7:
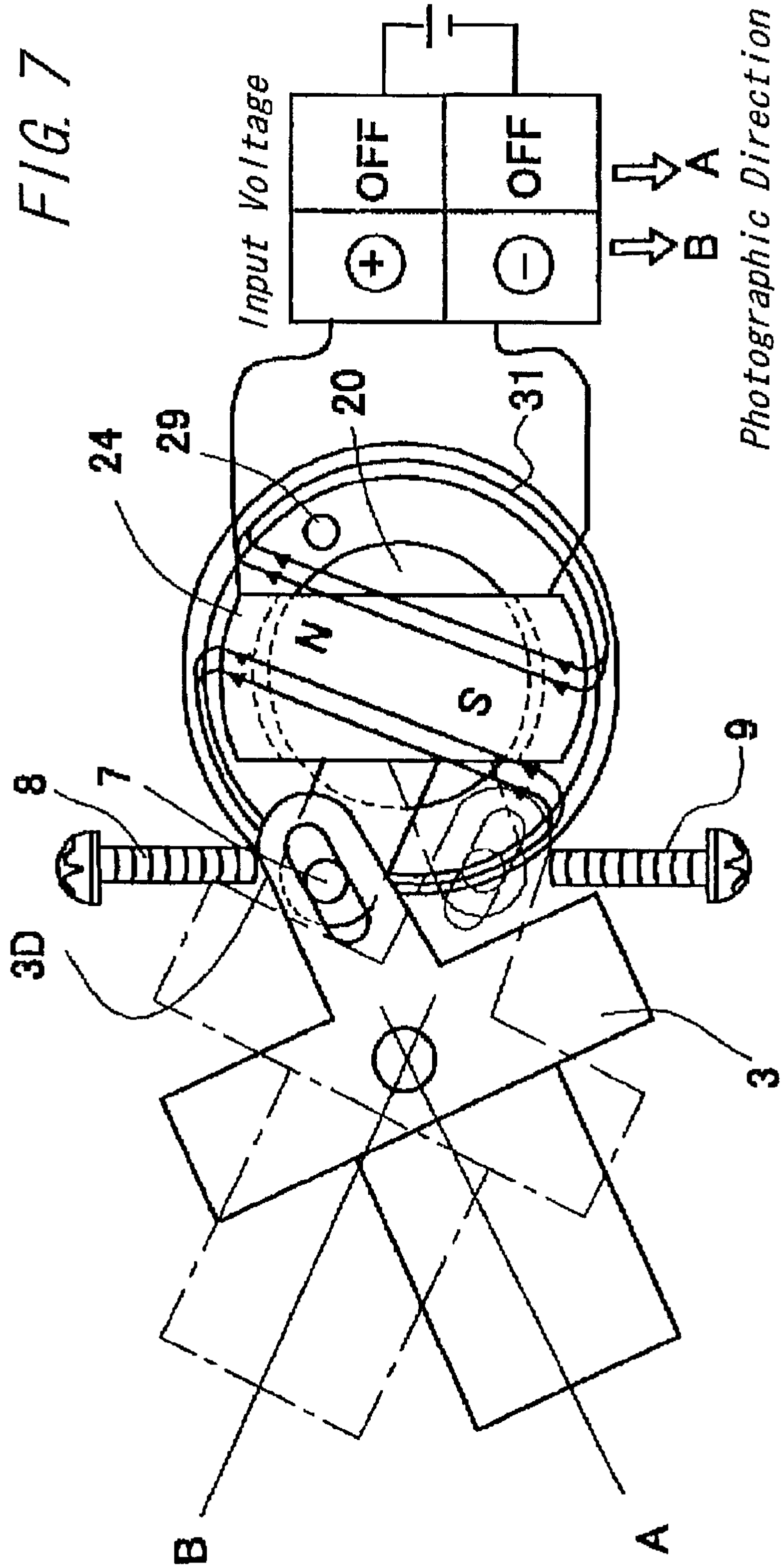
FIG. 7 is an explanatory view showing an operation of the two-direction pan camera.

As shown in FIG. 7, the strong magnetic body 29 may be arranged only on the N pole side of the rotor 20. The N pole of the rotor 20 is magnetically attracted to the strong magnet 29 within the rotational range. When a current flows in the excitation coil 24 to rotate the rotor 20 in a direction opposite to the attracted direction, the rotor 20 rotates and the shooting direction faces the direction B. The arm portion 3D formed on the camera unit 3 abuts against the adjustment screw 9 to stop and is held there. Also, by turning OFF the current flow in the excitation coil 24, the rotor 20 rotates and the arm portion 3D abuts against the adjustment screw 8 and is held there. Thus, the shooting direction faces the direction A. The strong magnetic body may be on the S pole side, and the attractive force may also be supplied by a spring or other elastic member.

Figure 8:
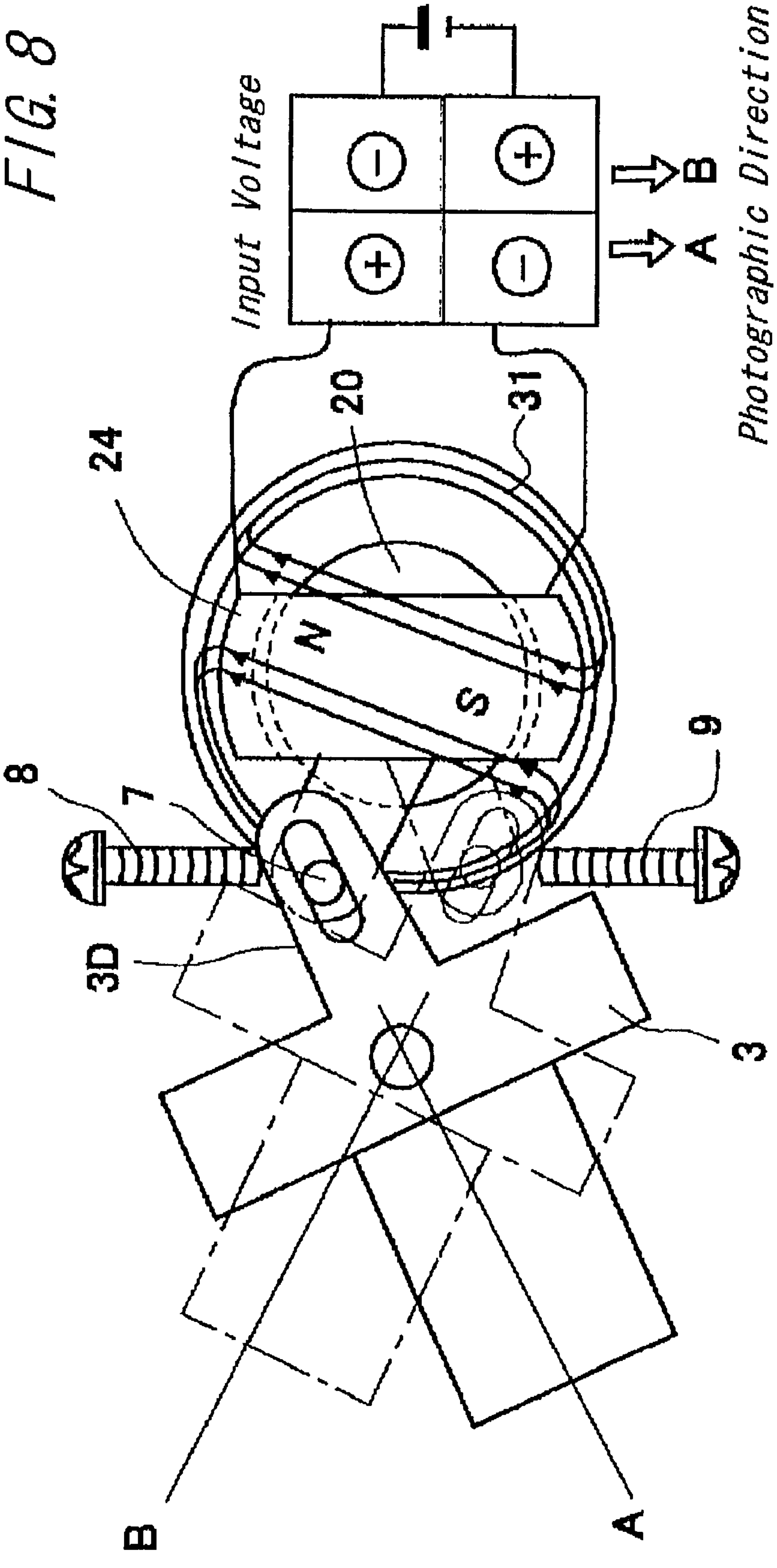
FIG. 8 is an explanatory view showing an operation of the two-direction pan camera.

As shown in FIG. 8, the strong magnetic body may be omitted. The rotor 20 rotates to the left or right directions depending on the current direction flowing in the excitation coil 24. The arm portion 3D formed on the camera unit 3 abuts against either of the adjustment screws 8 or 9 to stop, and the camera unit 3 is hold at that position, so that the shooting direction faces the direction A or B.

Figure 9:
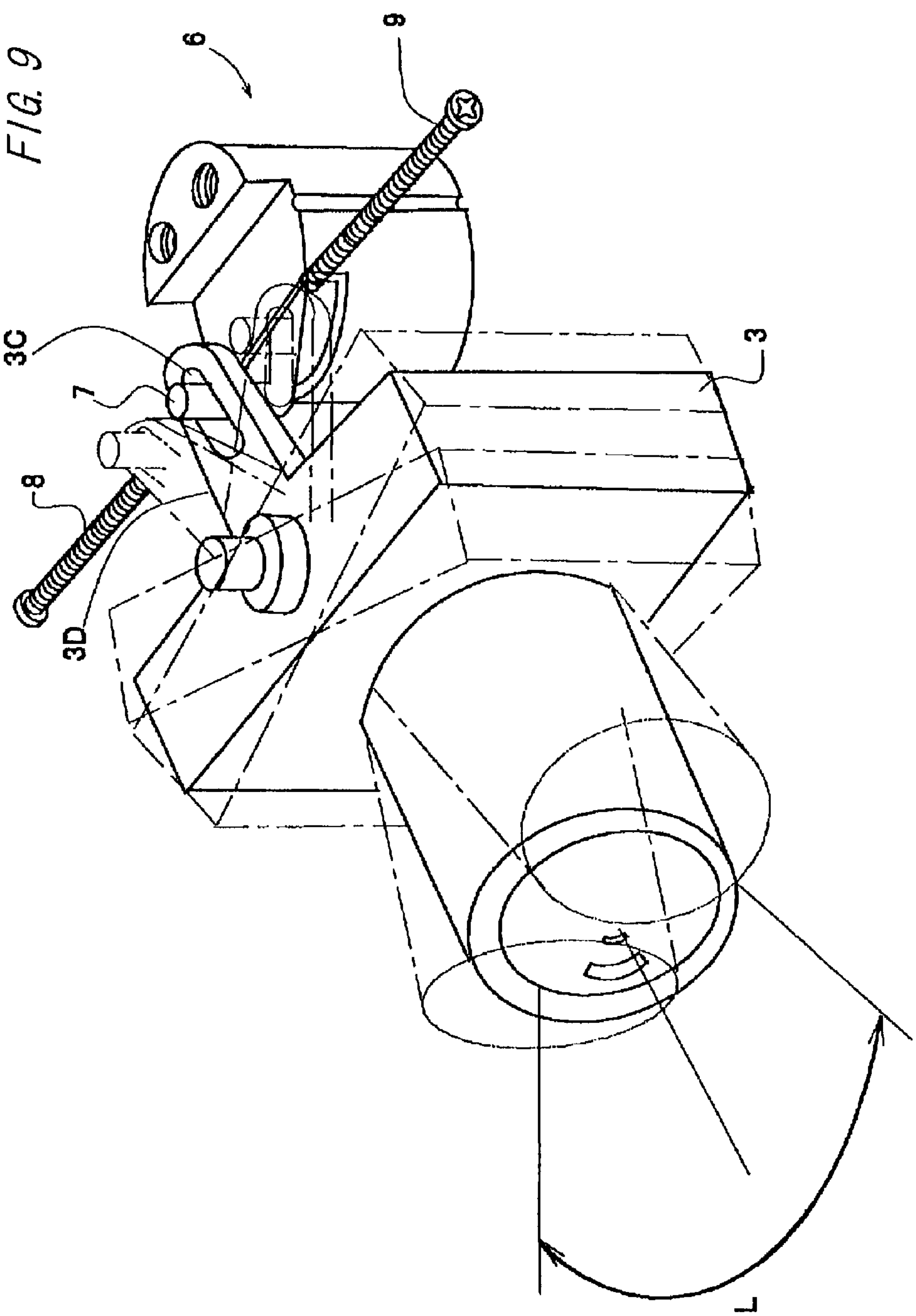
FIG. 9 is an explanatory perspective view showing a shooting direction of a three-direction pan camera.

Next, a three-direction pan camera will be explained as shown in the FIG. 9. An overall configuration of the camera unit is the same as that shown FIG. 1, so the explanation has been omitted.

Figure 10:
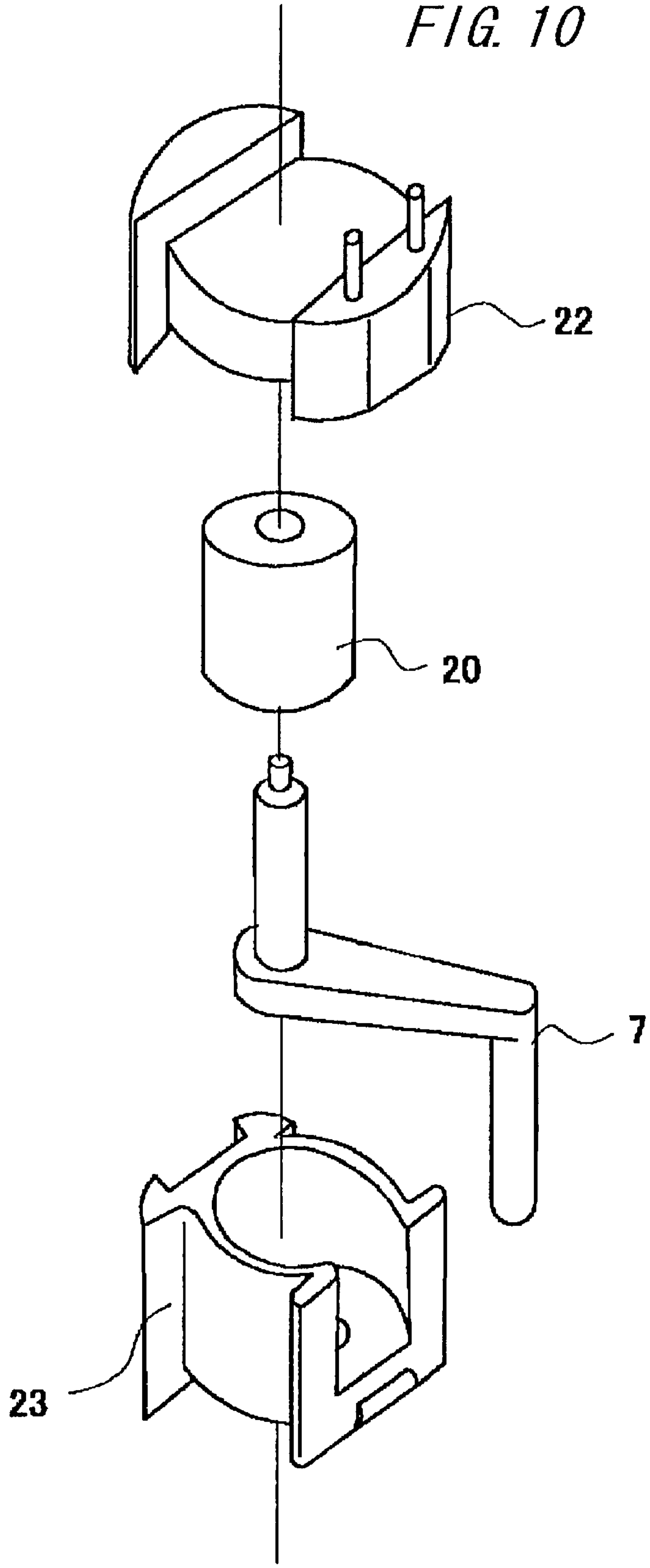
FIG. 10 is an exploded perspective view showing a rotor portion of the three-direction pan camera.

In a solenoid actuator, as shown in FIG. 10, the output shaft 7 is inserted and fixed in the center of the magnetic rotor 20 having a cylindrical shape and two magnetic poles therein, and is supported to rotate in the bobbins 22 and 23.

Figure 11:
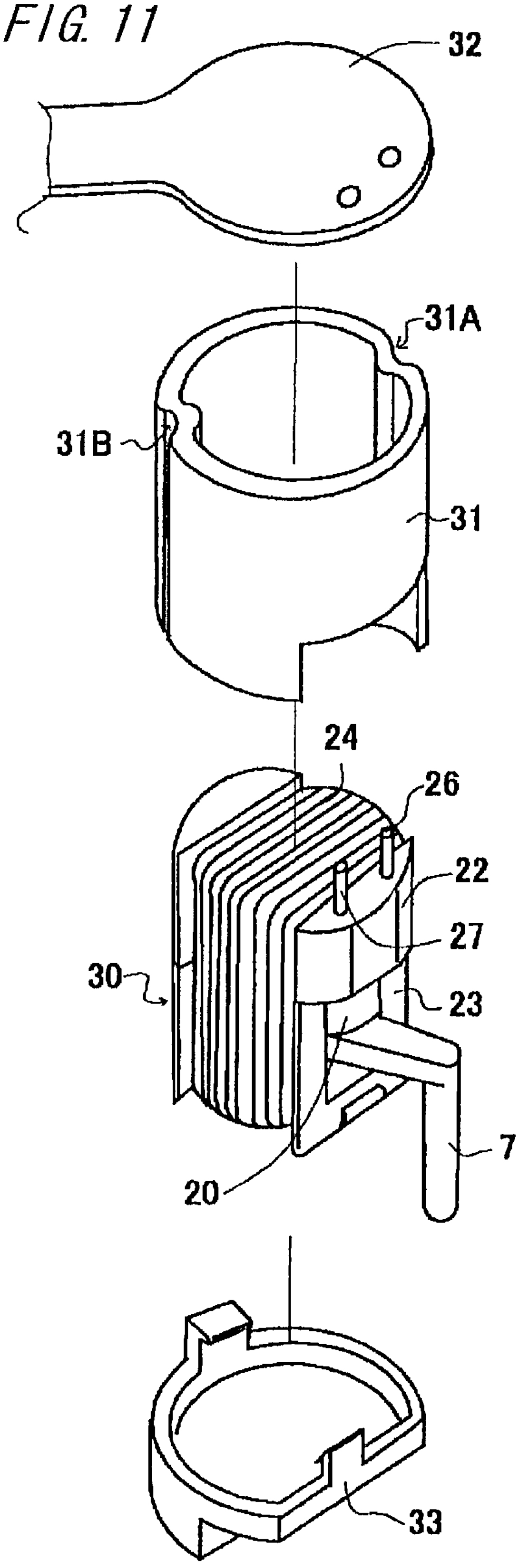
FIG. 11 is an exploded perspective view showing a solenoid actuator of the three-direction pan camera.

Further, the excitation coil 24 is arranged to cover the rotor 20 inside the bobbins 22 and 23 as shown in FIG. 11. The terminal pins 26 and 27 are fixed on the bobbin 22 to wind the wire ends of the excitation coil 24. The drive unit 30 of the configuration described above is enclosed and fits inside the hollow, cylindrically shaped magnetic circuit member (yoke) 31, the conductive wire print board 32 connected to the excitation coil 24 and the cover. Furthermore, the yoke 31 is provided with protruding portions 31A and 31B protruding toward inside thereof at two locations on a circumference of the yoke.

Figure 12:
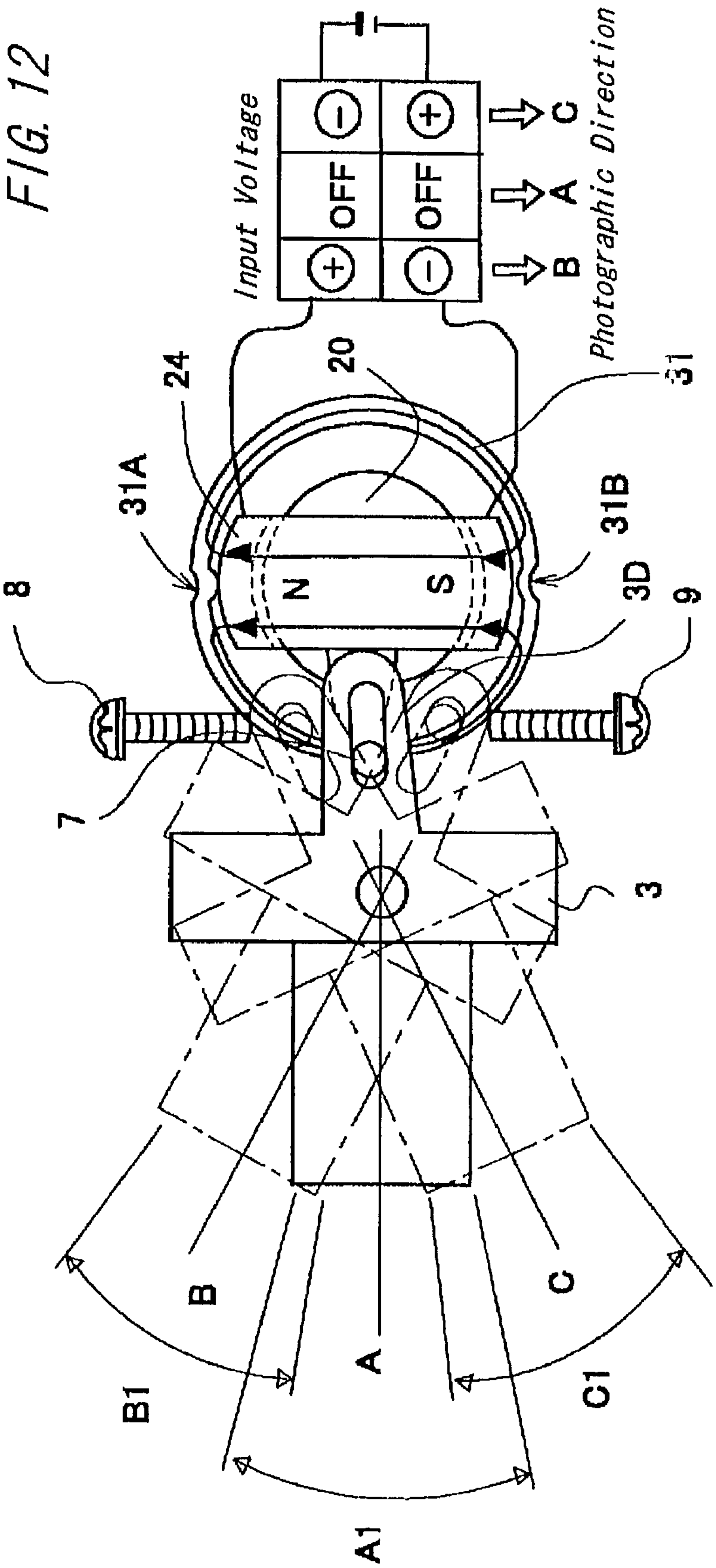
FIG. 12 is an explanatory view showing an operation of the three-direction pan camera.

Operations of the camera unit and the solenoid actuator will be explained below. FIG. 12 shows a relationship of the operations. When there is no current flowing in the excitation coil 24, the rotor 20 with the two magnetic poles is held with the N pole and the S pole being attracted to each of the protruding portions 31A and 31B on the yoke 31, thereby the camera unit 3 being directed to the direction A.

Figure 13:
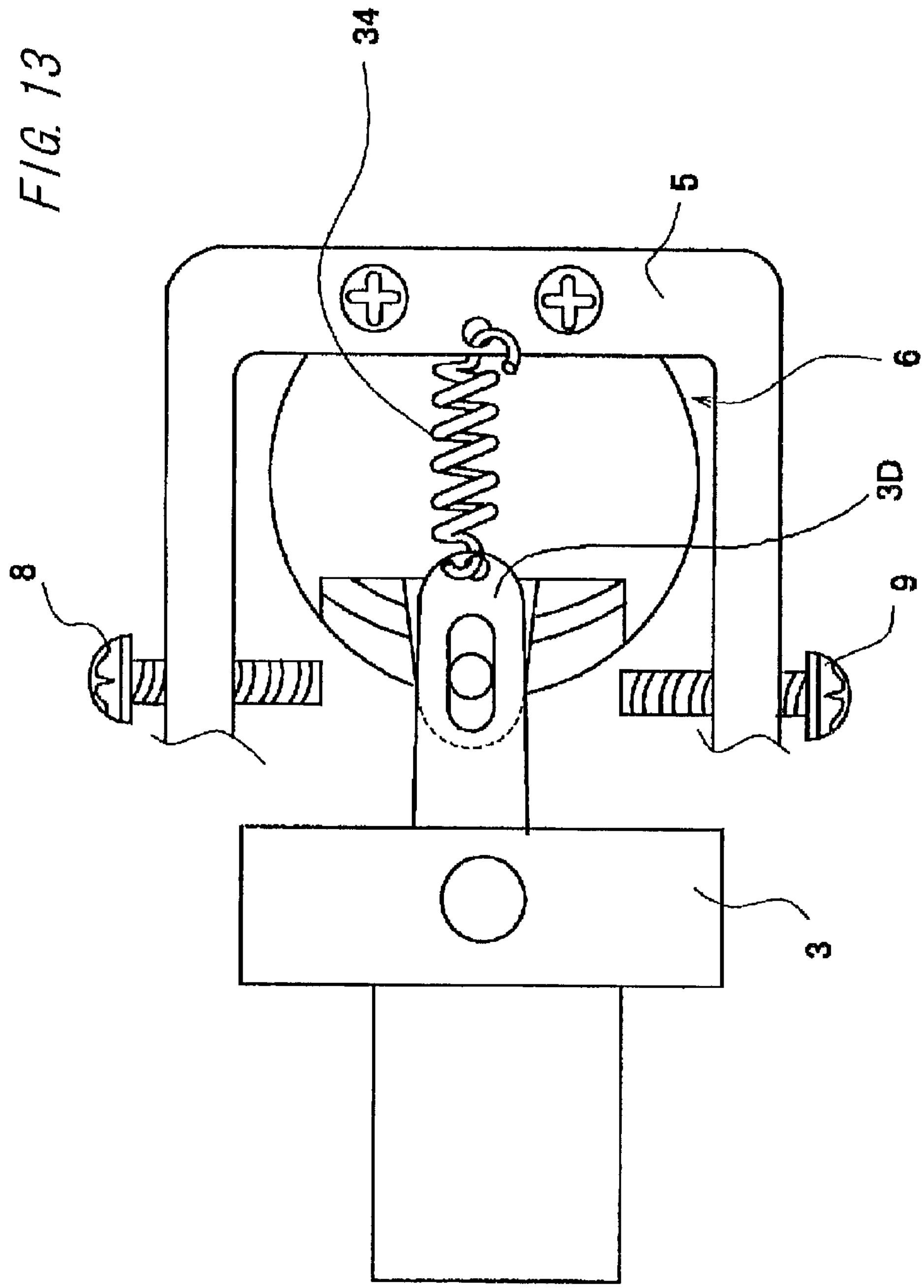
FIG. 13 shows a holding device of the three-direction pan camera.

Another holding means for the shooting direction of the camera unit 3 to face the direction A may also be achieved through the tension spring 34, as shown in FIG. 13, stretched between the rotating frame 5 and the arm portion 3D on the camera unit 3. Either of the holding methods is acceptable.

Also, when an electrical current flows in the excitation coil 24, the rotor 20 rotates in either the clockwise or the counterclockwise direction depending on the current flow direction in the excitation coil 24 and the magnetic effect on the rotor 20. When the electrical current continues to flow, the arm portion 3D formed on the camera unit 3 abuts against the adjustment screws 8 or 9 and stays at the position, thus the shooting direction of the camera faces the direction B or C.

The shooting direction A shown in FIG. 12 is determined by the positions of the protruding portions 31A and 31B established on the yoke 31, so it is possible to change the shooting direction by rotating the yoke 31 to change the positions of the protruding portions 31A and 31B.

Also, the shooting directions B and C are determined by the adjustment screws 8 and 9 that abut against the arm portion 3D formed on the camera unit 3. As shown in FIG. 1, it is possible to adjust the amount of protrusion of the distal ends of the adjustment screws 8 or 9 by rotating them thereby changing the shooting directions A and B. In such a case, the shooting ranges of A1, B1 and C1 may overlap with each other to eliminate the dead angle in the panning range of the camera unit.

The pan/tilt camera configuration according to an embodiment of the present invention has been explained, but the camera unit 3 in FIG. 1 may be applied to a removable pan/tilt apparatus.

While the invention has been explained with reference to the specific embodiments of the invention, the explanation is illustrative and the invention is limited only to the appended claims.

What is claimed is:

1. A pan/tilt apparatus comprising, a device frame, a rotating stand rotatably mounted to the device frame, regulating means disposed in the device frame for defining two end positions in an operational range of the rotating stand, drive means situated between the device frame and the rotating stand for driving the rotating stand and including a rotor formed of a permanent magnet, and a stator having an excitation coil for applying a rotational force to the rotor, and electric control means electrically connected to the excitation coil for controlling electrical current in the excitation coil so that the drive means selectively holds the rotor at the two end positions in the operational range when an electrical current flows in the excitation coil, to thereby be able to hold the rotating stand in the two end positions.

2. A pan/tilt apparatus according to claim 1, wherein said stator is fixed to the device frame, and the rotor includes an output shaft engaging an arm portion of the rotating stand so that when the drive means is actuated, the rotating stand is rotated.

3. A pan/tilt apparatus according to claim 2, further comprising a spring attached to the output shaft for holding the rotor at one of the two end positions.

4. A camera according to claim 1, wherein said rotor can move two directions according to a flow direction of an electric current in the excitation coil so that the rotor can stop two end positions to direct the lens portion to two directions.

5. A camera according to claim 4, wherein said shooting range of the lens portion overlaps when the rotating stand is held at one and the other of the two end positions.

6. A camera according to claim 1, wherein said electric control means comprises urging means for selectively holding the rotor at two end positions in the shooting range, said rotor being selectively rotated to change the end positions when a pulse electrical current flows in the excitation coil.

7. A camera according to claim 6, wherein said urging means comprises magnetic bodies disposed at the two end portions with a predetermined space with the rotor, respectively, said magnetic body attracting the rotor.

8. A camera comprising:

a camera portion having a lens portion and an imaging portion connected together, a fixed stator having an excitation coil, a rotor situated in the stator and formed of a permanent magnet to be able to rotate at least in one direction in a range of 180 degrees by excitation of the excitation coil, an output shaft attached to the rotor and engaging the camera portion so that when the rotator is actuated, the camera portion is moved in at least one direction in a shooting range of the lens portion to thereby direct the lens portion in at least two directions, and urging means attached to the output shaft for urging the rotor in one of two end positions so that when the excitation coil is not actuated, the rotor is held at one of the two end positions, and when the excitation coil is actuated, the rotor is rotated and held at the other of the two end positions.

9. A camera according to claim 8, further comprising adjusting means for adjusting two end positions of the shooting range.

10. A camera according to claim 8, wherein two tilting devices are installed, each being formed of said stator and rotor, one tilting device rotating the camera portion horizontally and the other tilting device rotating the camera portion vertically.

11. A camera according to claim 8, wherein said urging means comprises a magnetic body disposed at one of the two end portions with a predetermined space with respect to the rotor, said magnetic body attracting the rotor.

12. A camera according to claim 8, wherein said urging means is a spring for urging the rotor in one of the two end portions.

13. A camera comprising:

a camera portion having a lens portion and an imaging portion connected together, a fixed stator having an excitation coil, a rotor situated in the stator and formed of a permanent magnet to be able to rotate at least in one direction in a range of 180 degrees by excitation of the excitation coil, an output shaft attached to the rotor and engaging the camera portion so that when the rotator is actuated, the camera portion is moved in at least one direction in a shooting range of the lens portion to thereby direct the lens portion in at least two directions, and urging means attached to the rotor for holding the rotor at a middle of the operational range, said rotor being moved and stopped at two end positions of the shooting range according to flowing directions of a current in the excitation coil so that the camera portion can be directed to three directions by actuation of the current.

14. A camera according to claim 13, wherein said urging means comprises a magnetic body fixedly disposed relative to the rotor with a predetermined space therebetween.

15. A camera according to claim 14, further comprising adjusting means for adjusting positions of the magnetic body and the two end positions of the operational range.

16. A camera according to claim 13, wherein said urging means is a spring attached to the output shaft for urging the rotor in the middle of the operational range.

* * * * *